US012365831B2

(12) United States Patent
Miu et al.

(10) Patent No.: US 12,365,831 B2
(45) Date of Patent: Jul. 22, 2025

(54) QUANTUM-DOT OPTICAL FILM AND THE METHOD TO MAKE THE SAME

(71) Applicant: UBRIGHT OPTRONICS CORPORATION, Taoyuan (TW)

(72) Inventors: Chia-Yeh Miu, Taoyuan (TW); Ge-Wei Lin, Taoyuan (TW); Chia-Jung Chiang, Taoyuan (TW); Lung-Pin Hsin, Taoyuan (TW); Ying-Yi Lu, Taoyuan (TW); Jeffrey Wu, Taoyuan (TW); Hui-Yong Chen, Taoyuan (TW)

(73) Assignee: UBRIGHT OPTRONICS CORPORATION, Taoyuan County (TW)

(*) Notice: Subject to any disclaimer, the term of this patent is extended or adjusted under 35 U.S.C. 154(b) by 557 days.

(21) Appl. No.: 17/726,556

(22) Filed: Apr. 22, 2022

(65) Prior Publication Data
US 2022/0340811 A1 Oct. 27, 2022

Related U.S. Application Data

(60) Provisional application No. 63/177,965, filed on Apr. 22, 2021.

(51) Int. Cl.
*G02B 1/00* (2006.01)
*C08L 67/02* (2006.01)
(Continued)

(52) U.S. Cl.
CPC ............ *C09K 11/025* (2013.01); *C08L 67/02* (2013.01); *G02B 1/002* (2013.01); *G02B 1/04* (2013.01);
(Continued)

(58) Field of Classification Search
CPC .... C09K 11/025; C08L 67/02; C08L 2203/16; G02B 1/002; G02B 1/04; G02B 1/14; G02B 1/18; G02B 5/206; G02B 5/287; G02B 5/0242; G02B 5/20; G02B 2207/101; B82Y 20/00; B82Y 30/00; B82Y 40/00; C08J 5/18; C08J 2301/12; C08J 2333/04; C08J 2367/02; C08J 2369/00; C08J 2425/06; C08J 2433/12; B32B 23/00; B32B 23/04; B32B 27/06; B32B 27/08; B32B 27/36; B32B 27/365; B32B 27/18; B32B 27/308; B32B 27/32; B32B 7/023; B32B 2307/7244; B32B 2307/7265; C08K 3/22; C08K 3/30; C08K 3/32; C08K 3/34; C08K 3/346; C08K 3/36; C08K 3/40; C08K 5/34922; C08K 7/00; C08K 2003/3009; C08K 2003/3027
(Continued)

(56) References Cited

U.S. PATENT DOCUMENTS

2015/0314941 A1* 11/2015 Ramadas ................. C08J 7/048
428/326
2016/0160060 A1* 6/2016 Kikuchi ................ C08J 7/0427
313/503
(Continued)

*Primary Examiner* — William R Alexander
(74) *Attorney, Agent, or Firm* — Min-Lee Teng (57) ABSTRACT

A quantum-dot optical film comprises: a binder, wherein a plurality of quantum dots, and a plurality of clay fragments are dispersed in the binder, wherein each of the clay fragments is capable of being water-resistant and oxygen-resistant.

11 Claims, 4 Drawing Sheets

(51) Int. Cl.
  *C09K 11/02*    (2006.01)
  *G02B 1/04*     (2006.01)
  *G02B 5/20*     (2006.01)
  *G02B 5/28*     (2006.01)
  *B82Y 20/00*    (2011.01)

(52) U.S. Cl.
  CPC .......... *G02B 5/206* (2013.01); *G02B 5/287* (2013.01); *B82Y 20/00* (2013.01); *C08L 2203/16* (2013.01); *G02B 2207/101* (2013.01)

(58) Field of Classification Search
  USPC ........................................................ 359/577
  See application file for complete search history.

(56) References Cited

U.S. PATENT DOCUMENTS

| | | | | |
|---|---|---|---|---|
| 2019/0348578 | A1* | 11/2019 | Kuniyasu | H01L 33/502 |
| 2020/0181460 | A1* | 6/2020 | Johnson | H10K 50/84 |
| 2020/0224047 | A1* | 7/2020 | Yoshihara | C09D 11/322 |
| 2020/0332180 | A1* | 10/2020 | Zhou | C08J 5/18 |
| 2022/0339919 | A1* | 10/2022 | Miu | B32B 27/36 |

\* cited by examiner

QUANTUM-DOT OPTICAL FILM AND THE METHOD TO MAKE THE SAME

CROSS-REFERENCE TO RELATED APPLICATIONS

This application claims the benefit of U.S. provisional patent application No. 63/177,965, filed on Apr. 22, 2021, which is hereby incorporated herein by reference.

BACKGROUND OF THE INVENTION

1. Field of the Invention

The present invention relates to an optical film, and more particularly to a quantum-dot optical film.

2. Description of Related Art

The quantum dot is a semiconductor particle having a nanometer size and a spherical shape. The colored spectrum can be generated when the quantum dots are excited by light or electricity. The color of the excited light is determined according to the material and the size of the quantum dot. Because quantum dots can change the color of the light emitted by a light source, they can be widely used in display devices, such as liquid crystal displays (LCD). The quantum dots can enhance the color gamut, the color, and the brightness of the display device such that the display device can have a color gamut of about 110% NTSC (National Television System Committee).

The quantum dot is commonly made of IV, II-VI, IV-VI or III-V elements, such as Si, Ge, CdS, CdSe, CdTe, ZnSe, PbS, PbSe, InP, and InAs, wherein the most widely used are mainly CdSe and InP. QD Vision mainly uses CdSe as the material of the quantum dot, Nanoco mainly uses InP as the material of the quantum dot and Nanosys uses a combination of CdSe and InP as the material of the quantum dot.

The features of the quantum dots used in display devices include: (1) high color pureness and the peak shown in the spectrum is narrower and symmetrically distributed; (2) controlling the size and the material of the quantum dot can change the wavelength of the emission light to further adjust the color of the light, which can be shown in the emission spectrum; (3) better performance in the color with color gamut greater than 110% NTSC; (4) quantum efficiency of at least 90%, so light stability is good; (5) potentially achieving pixels of a nanometer-class, and as such, quantum dots can be used for manufacturing a screen of the highest resolution.

However, the conventional manufacturing complexity of a quantum-dot optical film is complicated and the total thickness of a quantum-dot optical film is too large.

Accordingly, the present invention proposes a new solution to overcome the above-mentioned disadvantages.

SUMMARY OF THE INVENTION

In one embodiment, the present invention discloses a quantum-dot optical film, wherein the quantum-dot optical film comprises: a binder, wherein a plurality of quantum dots and a plurality of clay fragments are dispersed in the binder, wherein each of the clay fragments is capable of being water-resistant and oxygen-resistant.

In one embodiment, the clay fragment is composed of multiple silicate layers.

In one embodiment, there is no barrier layer disposed over the quantum-dot layer for protecting the plurality of quantum dots from water or oxygen.

In one embodiment, the quantum-dot layer further comprises a plurality of diffusing particles dispersed in the binder.

In one embodiment, the binder comprises PET (polyethylene terephthalate).

In one embodiment, the concentration of the quantum dots in the binder is 0.05-20 wt. %.

In one embodiment, the concentration of the quantum dots in the binder is 0.05-8 wt. %.

In one embodiment, the thickness of the quantum-dot optical film is in the range of 25-350 μm.

In one embodiment, the binder comprises at least one of the following: PET (polyethylene terephthalate), PEN (polyethylene naphtholate), PAR (polyacrylate), PC (polycarbonates), and TAC (cellulose triacetate).

In one embodiment, the quantum-dot layer has a first major surface comprising a structured surface.

In one embodiment, the clay fragment comprises at least one of the following materials: glass flakes, mica, montmorillonite, talc, calcium the clay fragment, and aluminum the clay fragment.

In one embodiment, the concentration of the clay fragment in the binder is 0.05 to 10 wt. %.

In one embodiment, the concentration of the clay fragments in the binder is 0.1 to 5 wt. %.

In one embodiment, the quantum dots comprise cadmium (Cd).

In one embodiment, the concentration of the Cd in the binder is 0.1 to 20 wt. %.

In one embodiment, the concentration of the Cd in n the binder is 0.3 to 8 wt. %.

In one embodiment, the concentration of the Cd in the binder is 0.1-10 wt. %.

In one embodiment, the concentration of the Cd in the binder is 0.3-2 wt. %.

In one embodiment, the diffusion particles can be organic particles, such as PMMA, PS, Melamine, etc.

In one embodiment, the diffusion particles can be inorganic particles, such as Silicon, $SiO_2$, $TiO_2$, $CaCO_3$, $Al_2O_3$, $ZrO_2$, etc.

In one embodiment, the diffusion particles can be organic particles, such as PMMA, PS, Melamine, etc., or inorganic particles, such as Silicon, $SiO_2$, $TiO_2$, $CaCO_3$, $Al_2O_3$, $ZrO_2$, etc. The concentration can be from 2 to 40 wt. %, and the best is 5-15 wt. %.

In one embodiment, the thickness of quantum dot optical film material ranges from 25 μm to 350 μm.

In one embodiment, the present invention discloses a quantum-dot optical film, wherein the quantum-dot optical film comprises: a quantum-dot layer, comprising: a binder, wherein a plurality of quantum dots are dispersed in the binder; a first barrier film, disposed on a top surface of the quantum-dot layer, wherein a first plurality of clay fragments are dispersed in the first barrier film; and a second barrier film, disposed on a bottom surface of the quantum-dot layer, wherein a second plurality of clay fragments are dispersed in the second barrier film.

In one embodiment, the quantum-dot optical film further comprises a plurality of diffusing particles.

In one embodiment, the quantum-dot optical film comprises PET (polyethylene terephthalate).

In one embodiment, the concentration of the quantum dots in the binder is 0.05-20 wt. %.

In one embodiment, the concentration of the quantum dots in the binder is 0.05-8 wt. %.

In one embodiment, the concentration of the Cd in the binder is 0.1 to 20 wt. %.

In one embodiment, the concentration of the Cd in the binder is 0.3 to 8 wt. %.

In one embodiment, the concentration of the Cd in the binder is 0.1-10 wt. %.

In one embodiment, the concentration of the Cd in the binder is 0.3-2 wt. %.

In one embodiment, the thickness of the optical film is 25-350 μm.

In one embodiment, the optical film comprises at least one of the following: PET (polyethylene terephthalate), PEN (polyethylene naphtholate), PAR (polyacrylate), PC (polycarbonates), or TAC (cellulose triacetate).

In one embodiment, there is no barrier layer disposed over the quantum-dot layer for preventing the plurality of quantum dots from water or oxygen.

In one embodiment, the quantum-dot layer further comprises a plurality of diffusing particles.

In one embodiment, the thickness of the quantum-dot optical film is 25-350 μm.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as follows. The described preferred embodiments are presented for purposes of illustrations and descriptions, and they are not intended to limit the scope of the present invention.

Figure 1:
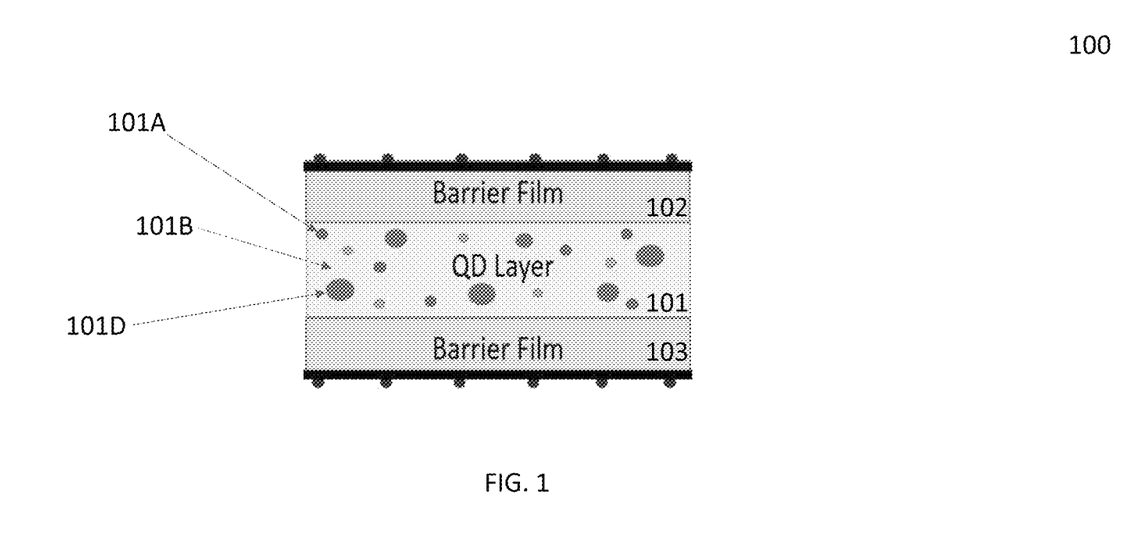
FIG. 1 illustrates a schematic cross-sectional view of a quantum-dot optical film.

The quantum dots in the quantum-dot optical film are highly sensitive to degradation, so the quantum-dot film should have excellent barrier properties to prevent damage to the quantum dots in the quantum-dot optical film caused by oxygen or water, which degrades the performance of the quantum-dot optical film. Conventionally, see FIG. 1, the quantum-dot optical film 100 includes a first barrier layer 102, a second barrier layer 103, and a quantum-dot layer 101 comprising a binder 101B being located between the first barrier layer 102 and the second barrier layer 103. A plurality of quantum dots 101A are dispersed in the binder 101B. The barrier layers 102, 103 can protect the quantum dots 101A from damage caused by oxygen or water. In addition, diffusion particles 101D can be disposed in the binder 101B.

In recent years, plastic filling and modification is an emerging industry in the plastics industry. With the rapid development of the plastics industry, the past single filling masterbatch technology has been developed to add inorganic materials, chemical additives, and other types of materials to make them highlight their respective characteristics and compatibility, and through advanced process technology, such as high-temperature mixing and extrusion film stretching technology, has become one of the important ways to modernize the special properties of plastic products. The functionality of inorganic materials is also given novel and unique properties along with the miniaturization of nanoscale, which can further improve the physical and mechanical properties of composite plastics.

The filler of nanocomposite materials is currently a two-dimensional layered structure, which has many characteristics that traditional composite materials do not have, such as high gas barrier properties, low hygroscopicity, and nanoscale dispersion scale. The polymer properties are greatly improved. The natural clay (clay) is composed of multiple silicate layers, which can be evenly distributed in the polymer substrate, forcing the gas molecules not to diffuse in a straight line and need to detour, thus increasing the gas barrier properties of the substrate. This filling modification technology can also be applied to the field of optical films. In contemporary display technology, the high color gamut and high purity of popular quantum dot backlights can create a more realistic and balanced color performance. However, for the quantum dot optical film used in this technology, the upper and lower layers need to use a traditional gas barrier film to protect the middle quantum dot adhesive layer. In addition, the traditional gas barrier film preparation method is to vaporize and deposit inorganic oxides (sputtering or vapor deposition) on the surface of the PET film, and the process technology is expensive. At the same time, the production process of the quantum dot film product is cumbersome, which greatly affects the production process. The applicability and popularization of the optical film are limited.

Figure 2:
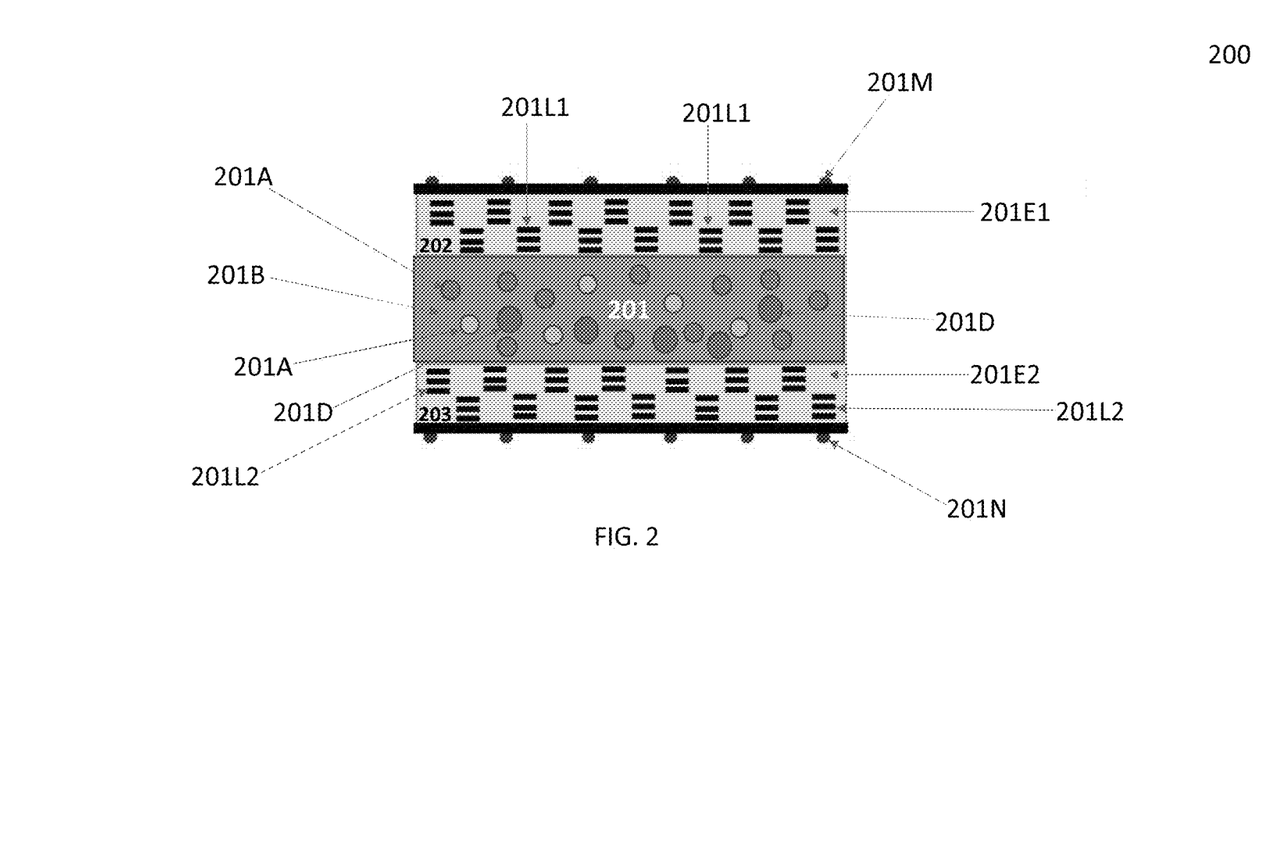
FIG. 2 illustrates a schematic cross-sectional view of the quantum-dot optical film according to one embodiment of the present invention.

FIG. 2 illustrates a schematic cross-sectional view of the quantum-dot optical film 200 according to one embodiment of the present invention. The quantum-dot optical film 200 comprises a quantum-dot layer 201 and a first barrier film 202 and a second barrier film 203, wherein the quantum-dot layer 201 comprises a binder 201B and a plurality of quantum dots 201A dispersed in the binder 201B, wherein the first barrier film 202 is disposed on a top surface of the quantum-dot layer 201, and the second barrier film 203 is disposed on a bottom surface of the quantum-dot layer 201, wherein a first plurality of clay fragments 201L1 are dispersed in the binder 201E1 of the first barrier film 202, and a second plurality of clay fragments 201L2 are dispersed in the binder 201E2 of the second barrier film 203, wherein each clay fragment of the clay fragments 201L1, 201L2 is capable of being water-resistant and oxygen-resistant.

In one embodiment, a plurality of diffusing particles 201D are dispersed in the binder 201B of the quantum-dot layer 201.

In one embodiment, the quantum-dot optical film 200 comprises a first major structured surface 201M that is on the top surface of the first barrier film 202 and a second major structured surface 201N that is on the bottom surface of the second barrier film 203.

In one embodiment, the binder 201B of the quantum-dot layer 201 comprises PET (polyethylene terephthalate).

In one embodiment, the plurality of quantum dots 201A comprises red quantum dots and green quantum dots.

In one embodiment, the concentration of the quantum dots 201A in the quantum-dot layer 201 is 0.05-20%.

In one embodiment, the concentration of the quantum dots in the quantum-dot layer is 0.05-8%.

In one embodiment, the thickness of the optical film is in the range of 25-350 μm.

In one embodiment, the binder 201B of the quantum-dot layer 201 at least one of the following: PET (polyethylene terephthalate), PEN (polyethylene naphtholate), PAR (polyacrylate), PC (polycarbonates), or TAC (cellulose triacetate).

The quantum dots 201A have high stability when exposed to high temperature or heat, so the surface of the quantum dots 201A can be specially treated to improve the ability to resist environmental damage caused by water and oxygen; therefore, the quantum dots 201A are capable of being water-resistant and oxygen-resistant enough without a barrier layer formed over/on each of the first major surface 211 and the second major surface 212 of the quantum-dot layer 201.

In one embodiment, a method to form the quantum-dot optical film 200 is described below according to one embodiment of the present invention. Step 1. put the PET fragment in a 100° C. oven to dry for 24 hrs; step 2. take the clay PET fragments and PET fragments respectively, pour them into the micro-mixer, carry out the nano-dispersion process under the action of high shear force at a high temperature of 280° C.; step 3: form the clay PET sheet into a clay PET optical film (CP) by biaxial stretching, wherein clay PET optical film (CP) is shown in FIG. 2.

Figure 3:
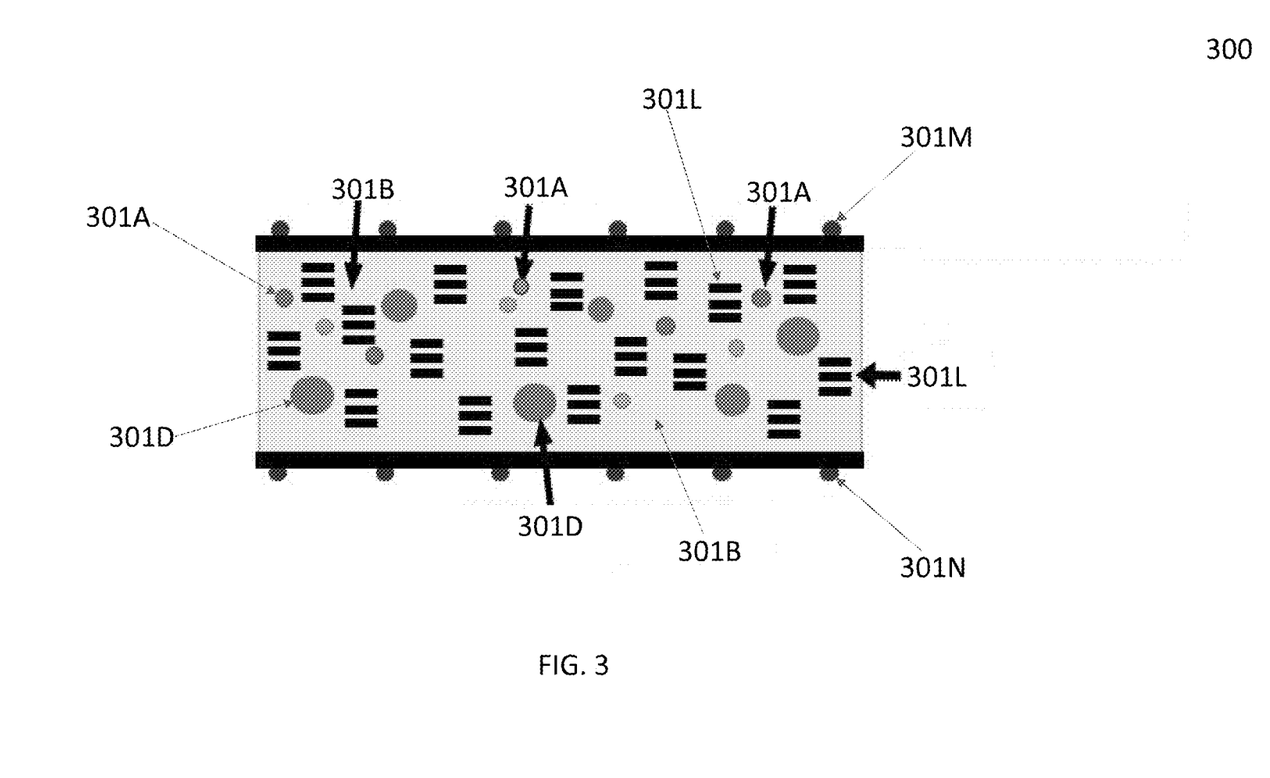
FIG. 3 illustrates a schematic cross-sectional view of the quantum-dot optical film according to one embodiment of the present invention.

FIG. 3 illustrates a schematic cross-sectional view of the quantum-dot optical film 300 according to one embodiment of the present invention. A quantum-dot optical film 300 comprises: a binder 301B, wherein a plurality of quantum dots 301A and a plurality of clay fragments 301L are dispersed in the binder 301B, wherein each of the clay fragments 301L is capable of being water-resistant and oxygen-resistant.

In one embodiment, a plurality of diffusing particles 301D are dispersed in the binder 301B.

In one embodiment, the clay fragment 301L is composed of multiple silicate layers.

In one embodiment, there is no barrier layer disposed over the quantum-dot optical film for protecting the plurality of quantum dots from water or oxygen.

In one embodiment, the quantum-dot optical film further comprises a plurality of diffusing particles dispersed in the binder.

In one embodiment, the binder comprises PET (polyethylene terephthalate).

In one embodiment, the concentration of the quantum dots in the binder is 0.05-20%.

In one embodiment, the concentration of the quantum dots in the quantum-dot binder is 0.05-8%.

In one embodiment, the thickness of the quantum-dot optical film is in the range of 25-350 μm.

In one embodiment, the binder comprises at least one of the following: PET (polyethylene terephthalate), PEN (polyethylene naphtholate), PAR (polyacrylate), PC (polycarbonates), and TAC (cellulose triacetate).

In one embodiment, the quantum-dot optical film 300 has a first major surface comprising a structured surface.

In one embodiment, the clay fragment comprises at least one of the following materials: glass flakes, mica, montmorillonite, talc, calcium the clay fragment, and aluminum the clay fragment.

In one embodiment, the concentration of the clay fragments in the binder is 0.05 to 10 wt. %.

In one embodiment, the concentration of the clay fragments in the binder is 0.1 to 5 wt. %.

In one embodiment, quantum dots comprise cadmium (Cd).

In one embodiment, the concentration of the Cd in the binder is 0.1 to 20 wt. %.

In one embodiment, the concentration of the Cd in the binder is 0.3 to 8 wt. %.

In one embodiment, the diffusion particles can be organic particles, such as PMMA, PS, Melamine, etc.

In one embodiment, the diffusion particles can be inorganic particles, such as Silicon, SiO2, TiO2, CaCO3, Al2O3, ZrO2, etc.

In one embodiment, the diffusion particles can be organic particles, such as PMMA, PS, Melamine, etc., or inorganic particles, such as Silicon, SiO2, TiO2, CaCO3, Al2O3, ZrO2, etc. The concentration can be from 2 to 40 wt. %, and the best is 5-15 wt. %.

In one embodiment, the thickness of quantum dot optical film material ranges from 25 μm to 350 μm.

In one embodiment, a method to form the quantum-dot optical film 300 is described below according to one embodiment of the present invention. Step 1: put the PET fragment & PMMA beads in a 100° C. oven to dry for 24 hrs; step 2: take green quantum dots (GQD) and PET fragments with high thermal stability surface modification and anti-water and oxygen function, pre-mix them uniformly, and then pour them into a micro-twin screw extruder, at a high temperature of 280° C., wherein under the action of its high shear force, the nano hot melt mixing and dispersing process is carried out. After mixing for 10 minutes, it is extruded to form a high concentration of GQD in PET; step 3: take the red quantum dots (RQD) and PET fragments with high thermal stability surface modification and anti-water and oxygen function, pre-mix them uniformly, and then pour them into the micro-mixer, and use their high shear force at 280° C., wherein the nano-hot melt mixing and dispersing process is carried out to form RQD in PET; step 4: take PMMA beads and PET fragments and pre-mix them uniformly and then pour them into a micro-mixer, wherein under the action of high shear force at a high temperature of 280° C., the nano-hot melt mixing and dispersing process is carried out to form PMMA in PET; step 5: take GQD in PET, RQD in PET, PMMA in PET, clay PET fragment and PET fragment respectively, pour them into a micro-mixer, wherein under the action of high shear force at 280° C., the nano-dispersion and hot-melt mixing process are carried out, after mixing for 10 min, the film is obtained by extruding; step 6: by biaxial stretching technology, a clay PET quantum dot optical film (QICP) can be formed, as shown in FIG. 3.

In one embodiment, the quantum-dot optical film 300 is capable of being supported by itself without a supporting layer formed over each of the first major surface 301M and the second major surface 301N of the optical film 300. Therefore, the material of the binder 301B of the quantum-dot optical film 300 should be selected such that the quantum-dot optical film 300 is capable of being supported by itself without a supporting layer formed over each of the first major surface 301M and the second major surface 301N. In addition, the material of the binder 301B should be selected such that the quantum dots 301A are protected from damage caused by oxygen or water. In one embodiment, the material of the binder 201B can include at least one of the following: PET (polyethylene terephthalate), PEN (polyethylene naphtholate), PAR (polyacrylate), PC (polycarbonates), and TAC (cellulose triacetate). Preferably, the material is PET (polyethylene terephthalate). The material can be pure PET (polyethylene terephthalate). The material of the binder 301B can be unitary or homogeneous.

In one embodiment, the quantum dots 301A can comprise green quantum dots and red quantum dots. The material of the quantum dots 3201A can comprise CdS, CdSe, CdTe, ZnSe, PbS, PbSe, InP, InAs, InGaP, ZnS, or ZnTe, but the present invention is not limited thereto. The material of the quantum dots 201A can comprise Cd (e.g., CdSe) or be Cd-free (e.g., InP).

In one embodiment, the concentration of the quantum dots 301A in the binder 301B can be in the range from 0.1% to 20%, preferably, from 0.3 to 8 wt %.

In one embodiment, the concentration of the quantum dots 301A in the binder 301B is 0.05-20 wt %.

In one embodiment, the concentration of the quantum dots 301A in the binder 301B is 0.05-8 wt %.

In one embodiment, the thickness of the quantum-dot optical film is 25-350 μm.

In one embodiment, the quantum-dot optical film 300 can comprise a plurality of diffusing particles 301D; the diffusing particles 301D are further provided to increase the uniformity of the quantum dots 301A dispersed in the binder 201B. The material of the diffusing particles 301D can be organic (e.g., PMMA (polymethyl methacrylate), PS (polystyrene), Melamine) or inorganic (e.g., silicon, $SiO_2$, $TiO_2$, $CaCO_3$, $Al_2O_3$, $ZrO_2$). The concentration of the diffusing particles can be in the range from 2% to 40%, preferably, from 5% to 15 wt %.

The structured surface 301M, 301N can be used for reducing the undesired photo phenomenon, such as Newton's rings. The matt structure can be used to form each of the structured surfaces 301M, 301N.

In one embodiment, the clay PET fragment with water and oxygen resistance function is formed by nano-dispersion process technology, and then by the co-extrusion film-forming technology of PET lipid particles, to form a water and oxygen resistant clay PET optical film (CP), as shown in FIG. 2, is equivalent to the upper and lower traditional gas barrier layers used in the quantum dot optical film of the sandwich structure.

In one embodiment, the manufacturing process can be a co-extrusion process which is one of the stretch-forming technologies used for film-forming. The stretch-forming technology can be a bi-axially stretch-forming technology. The co-extrusion is a process in which two or more plastic materials, each of which has a property $X_i$, are extruded and combined to form a structure having a combination of the properties $X_1, X_2, \ldots X_N$ (N is an integer and larger than 1) of the two or more plastic materials. When performing the coextrusion process by using two plastic materials in Embodiment A1, one plastic material can be the first component and the other plastic material can be the second component. When performing the co-extrusion process by using three materials in Embodiment A2, one plastic material can be the first component, another material can be the second component and the other plastic material can be the third component.

In one embodiment, the plurality of quantum dots are dispersed into the spaces between particles of the PET by a micro-twin screw extruder nano-dispersion processing technology.

In one embodiment, a PET co-extrusion and biaxial stretching technology are used to form a PET quantum-dot optical film. The PET quantum-dot optical film does not need to have an additional gas barrier film (gas barrier film) and can still achieve the same anti-environmental test level.

By using the stretch forming technology for PET production, PET material with characteristic modification can directly mix QD particles with added composite materials, which not only simplifies the QD film attaching process but also achieves the goal of thinning the product (25 μm-350 μm) and saving production time (conventional QD film takes half a day to complete, while the process of the present invention only takes 20-30 mins). The cost of the process of the present invention can reduce by 20 to 30% compared to the conventional methods, which will help to improve the application and popularity of the quantum-dot optical film in the future.

Figure 4:
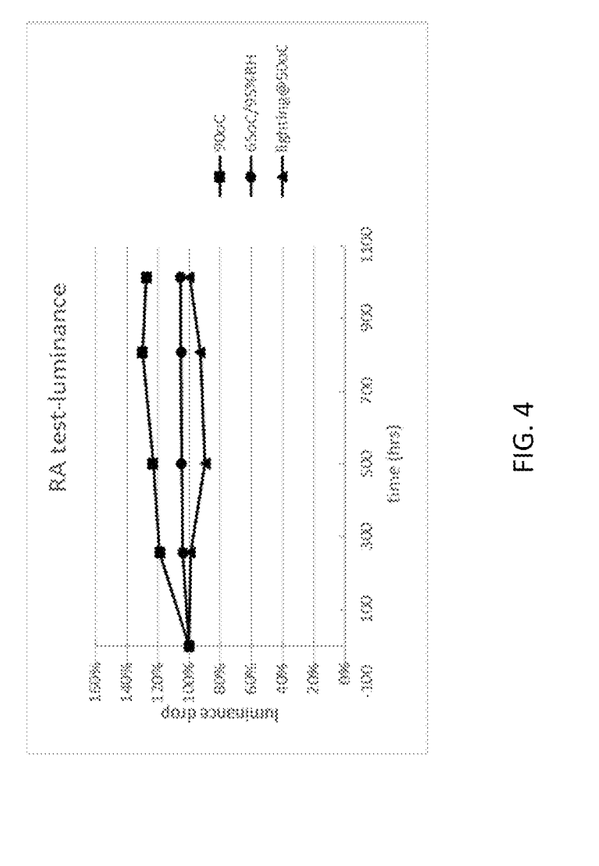
FIG. 4 illustrates a chart to show the luminance stability of the quantum-dot optical film of the present invention.

FIG. 4 illustrates a chart to show the luminance stability of the quantum-dot optical film of the present invention. As shown in FIG. 4, Whether in dark state storage (65° C./95% RH, 90° C.) and bright state lighting (lighting@50oC) reliability test (spec: luminance decay rate <15%), its stability can reach at least 1000 hrs or more, and at the same time it can achieve the same effect as the traditional sandwich structure quantum dot optical film, so it has more price advantages in the cost of substrate materials and formulations. The quantum dot optical film of the present invention eliminates the need to use expensive traditional gas and moisture barrier films to protect quantum dots from water vapor corrosion.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A quantum-dot optical film comprising: a binder, wherein a plurality of quantum dots and a plurality of clay fragments are dispersed in the binder, wherein each of the clay fragments is capable of being water-resistant and oxygen-resistant, wherein the quantum-dot optical film further comprises a plurality of diffusing particles dispersed in the binder.

2. The quantum-dot optical film according to claim 1, wherein each of the plurality of clay fragments is composed of multiple silicate layers.

3. The quantum-dot optical film according to claim 1, wherein there is no barrier layer disposed over the quantum-dot optical film for protecting the plurality of quantum dots from water or oxygen.

4. The quantum-dot optical film according to claim 1, wherein the binder comprises PET (polyethylene terephthalate).

5. The quantum-dot optical film according to claim 1, wherein the thickness of the quantum-dot optical film is in a range of 25-350 um.

6. The quantum-dot optical film according to claim 1, wherein the concentration of the clay fragments in the binder is 0.05 to 10 wt %.

7. The quantum-dot optical film according to claim 1, wherein the concentration of the clay fragments in the binder is 0.1 to 5 wt %.

8. The quantum-dot optical film according to claim 1, wherein the quantum dot comprises cadmium (Cd).

9. The quantum-dot optical film according to claim 8, wherein the concentration of the Cd in the binder is 0.1 to 20 wt %.

10. A quantum-dot optical film comprising: a binder, wherein a plurality of quantum dots and a plurality of clay fragments are dispersed in the binder, wherein each of the clay fragments is capable of being water-resistant and oxygen-resistant, wherein the concentration of the quantum dots in the binder is 0.05-20 wt %.

11. A quantum-dot optical film comprising: a binder, wherein a plurality of quantum dots and a plurality of clay fragments are dispersed in the binder, wherein each of the clay fragments is capable of being water-resistant and oxygen-resistant, wherein the concentration of the quantum dots in the binder is 0.05-8 wt %.

\* \* \* \* \*